Jan. 26, 1954 H. S. PASTURCZAK 2,667,321
LOCKING COLLAR FOR INSTRUMENT MOUNTINGS
Filed Oct. 12, 1951 2 Sheets-Sheet 2

INVENTOR.
Harry S. Pasturczak
BY
Harvey M. Gillespie
Atty.

Patented Jan. 26, 1954

2,667,321

UNITED STATES PATENT OFFICE 2,667,321

LOCKING COLLAR FOR INSTRUMENT MOUNTINGS

Harry S. Pasturczak, East Moline, Ill.

Application October 12, 1951, Serial No. 251,017

4 Claims. (Cl. 248—183)

The present invention relates to an improved adjustable locking collar designed for use in connection with instrument mountings of the type shown and described in my prior Patent 2,524,473, dated October 3, 1950, for Instrument Mounting.

Briefly the instrument mounting shown and described in the above-mentioned patent includes a base socket member adapted to be carried on a tripod or other fixed instrument support, together with a split elbow structure having a vertically extending composite split leg section telescopically received within the socket member and a horizontally extending composite split arm section on which there is mounted a locking collar of the type to which the present invention appertains. The locking collar of said patent includes an expansible and contractible friction band which operates generally in the manner of a brake band to apply pressure to the composite split arm on which the locking collar is mounted, not only to lock the collar in any desired position of adjustment, but also to compress the split sections of the horizontal arm and move them toward each other to rock the sections about a fulcrum axis and expand the split leg sections against the wall of the socket in which they are disposed to thereby lock the split elbow structure in its entirety against rotation about a vertical axis. The locking collar constitutes a mounting element on which an instrument supporting pad is adapted to be mounted in the conventional manner and toward this end the locking collar is provided with an offset attachment lug.

The expansion and contraction of the friction band of said patent is controlled by means of a pistol grip structure having an operating trigger which when released applies the force of a loaded spring to the friction band to contract the same upon the horizontal arm of the elbow structure. When the trigger is depressed, the load of the spring is relieved and the friction band is allowed to expand so that universal movement of the instrument is made possible.

It is among the principal objects of the present invention to provide a locking collar of the general class disclosed in said patent, but which is of improved construction whereby the completed article may be made up from a number of inexpensive prefabricated elements, certain of which may be formed of sheet metal and which are so assembled upon each other as to produce a locking collar which will perform its functions more efficiently than heretofore.

Another object of the invention is to provide such a locking collar having associated therewith a pair of spaced confining cylindrical wall surfaces or edges which are disposed on opposite sides of a friction band portion and which are concentric with the friction band when the latter is in its applied position and which serve to limit the extent of spreading movement of the split horizontal arm portion of the split elbow structure on which the locking collar is mounted, as well as to render a more stable structure in which there is less tendency for the split sections of the elbow to shift axially relative to each other.

Other objects and advantages of the invention not at this time enumerated will become more readily apparent as the nature of the invention is better understood.

In the accompanying single sheet of drawings forming a part of this specification, a preferred embodiment of the improved locking collar has been shown, wherein:

Fig. 1 is a longitudinal, sectional view taken substantially centrally through a pistol grip assembly and transversely through a split collar assembly of an instrument mounting and showing the improved locking collar in operative position on the latter;

Fig. 2 is an enlarged fragmentary end elevational view of the structure shown in Fig. 1. In this view certain parts are shown in section to more clearly reveal the nature of the invention;

In all of the above described views similar characters of reference are employed to designate similar parts throughout.

Figure 3:
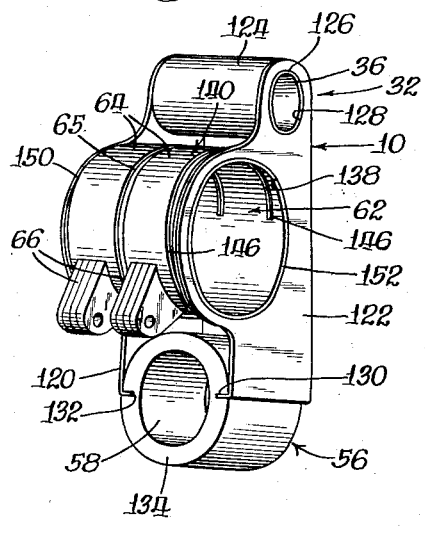
Fig. 3 is a perspective view of the improved locking collar.
Figure 4:
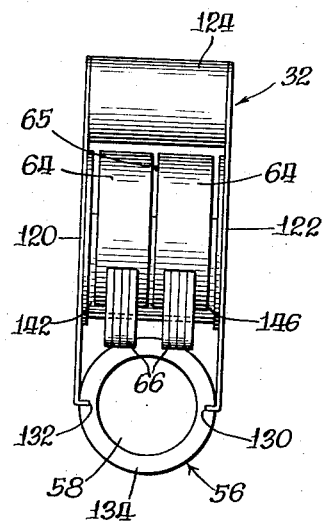
Fig. 4 is a front view in elevation of the improved locking collar shown in Fig. 3.
Figure 5:
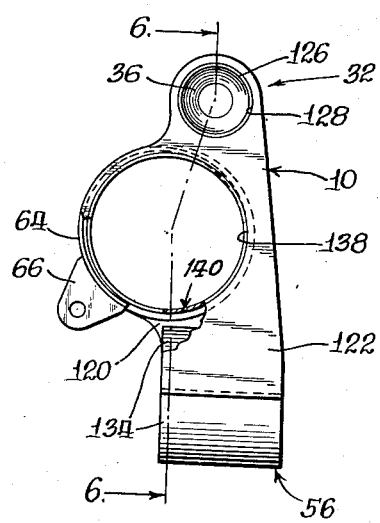
Fig. 5 is a side view in elevation, with parts broken away for purpose of clearness of illustration, of the locking structure shown in Fig. 4.
Figure 6:
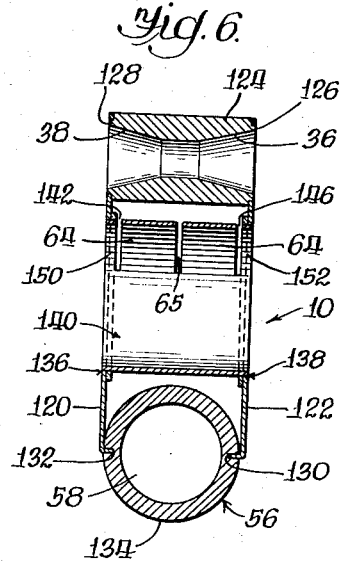
Fig. 6 is a sectional view taken on line 6—6 of Fig. 5.

Referring now to the drawings in detail, the improved locking collar is shown in Fig. 3 and is designated in its entirety at 10. This locking collar is designed for use in connection with an instrument mounting of the type shown in the above-mentioned patent and which has been illustrated in Figs. 1 and 2 to a degree sufficient to lead to an understanding of the nature and function of the locking collar.

The instrument mounting shown in Figs. 1 and 2 involves in its general organization a two-piece split fitting or elbow 12 which is preferably though not necessarily constructed as illustrated in my co-pending application Serial 251,016, filed October 12, 1951. The said split elbow herein shown, when assembled in the instrument mounting, includes a composite vertical leg 14, a composite horizontal arm 16 and a composite connecting elbow portion 18. The leg 14 is telescopically received and supported in a base socket member 20 in which it is retained by means of a keeper screw 22 which extends through the base into an annular groove 24 provided at the lower end of the leg 14. The elbow 12 is thus capable of rotational movements about the vertical axis of the socket member 20 for panoramic sweeping movements of the camera or other instrument carried by the mounting. The arm 16 receives thereover the locking collar 10 of the present invention and on which the instrument is adjustably mounted. The locking collar is capable of tilting movements about the horizontal axis of the arm 16, when released for such tilting movement, or of being locked to the arm 16 against tilting movement thereon.

The adjustable mounting for the instrument on the locking collar assembly 10 includes an instrument supporting assembly 26 having an adjustable pad 28 providing a seat on which the instrument, which may be a camera (not shown), is clamped. The pad 28 is provided with the usual stud and thumb wheel assembly 30. The locking collar includes an upper offset apertured lug 32 on which the assembly 26 is adjustably mounted and to which it is adapted to be adjustably clamped by means of a clamping knob 34. The opening or aperture 36 in the lug 32 is cone-shaped in design and receives the corresponding tapered portion 38 of a clamping bolt 40. The bolt 40 extends through a portion of the adjustable pad 28 on which the instrument is clamped and the pad is provided with spaced clamping surfaces 42 and 44 which engage the opposite side face of the lug 32. A pin and slot connection 46 prevents turning movement of the clamping bolt relative to the pad 28. The clamping knob 34 is threadably received on the end of the bolt 40 and, when tightened against the outer face of the adjusting pad, draws the tapered surfaces of the bolt 40 and lug 32 into clamping engagement with each other to clamp the pad in a desired adjusted position. The above-described adjustable mounting forms no part of the present invention and reference may be had to the above-mentioned patent for a more complete disclosure and description of the operation thereof, it being sufficient for purposes of the present invention to state the function of the apertured lug 32 on the collar 10 is to provide an adjustable support for the instrument supporting assembly 26.

The split elbow 12 comprises two separable, similar, complementary L-shape sections 48 and 50, the adjacent faces of the sections being formed with cooperating fulcrum bearings at a location intermediate their ends, so that pressure applied to the split sections of the horizontal arm 16 tending to bring the opposed surfaces 52 and 54 thereof together will force the split sections of the vertical leg 14 apart outwardly and into frictional holding engagement with the cylindrical wall of the socket member 20, so as to hold the split elbow 12 against turning movement about its vertical axis.

The locking collar 10 of the present invention is provided with a second and lower lug 56 having a cylindrical bore 58 therein, the axis of which extends at a right angle to the axis of the cone-shaped bore provided in the upper aperture lug 32 and this lower lug 56 is provided for the purpose of supporting an operating handle or pistol grip assembly 60, the nature and function of which will appear presently. The locking collar 10 is further provided with an enlarged opening or bore 62 therethrough, through which the forward end of the horizontal arm 16 of the split elbow structure 12 extends and on which arm the locking collar is supported for angular tilting movement about a horizontal axis. The locking collar includes a yieldable friction band 64 which is split medially and circumferentially thereabout as at 65 and which encompasses the arm 16 and is movable into and out of clamping arrangement with the latter. The straps or sections of the split band 64 are resilient and are normally sprung outwardly so as to relieve their gripping action on the split arm 16 and they are capable of being forced into gripping engagement with the arm, in the manner of a brake band, by means of a pair of attachment lugs 66 which are operatively connected through a train of mechanism about to be described to a compression spring 68 associated with the operating handle or piston grip assembly 60.

The pistol grip assembly 60 includes a barrel portion 72, the forward end of which projects through a sleeve or thrust bushing 74 yieldingly and frictionally held in the offset apertured lug 32 provided on the body portion of the locking assembly 24. The barrel 72 projects into the casing 77 of the pistol grip assembly and is provided with a clearance slot 78 through which there extends the upper end of a trigger member 80 which is pivoted as at 82 to the casing 77 which depends from the latter. The casing 77 is provided with a trigger handle 84 in which the trigger 80 is guided. The sleeve 74 and barrel 72 are secured together against relative turning movement by means of a pair of screws 86 which pass through the sleeve and into the wall of the barrel. The body portion 77 including the handle 84, together with the barrel 72, is capable of lateral swinging movement about the axis of the barrel to accommodate the natural position of the wrist and hand when operating the instrument mounting.

The pressure spring 68 is disposed within the barrel 72 adjacent its rear end and pressure exerted by the spring is adapted to be applied to the clamping bands 64 of the locking collar 10 through the medium of a sectional thrust rod including a rear rotatable section 88 and a front non-rotatable section 90, both sections being disposed within the barrel 72 in end-to-end relationship. The non-rotatable section 90 is provided with an ear 92 which projects upwardly through a slot 94 provided in the barrel 72 in the upper regions thereof and which slot is of fairly large circumferential extent in order to give a wide angle of swinging movement to the pistol grip handle 84. The rear rotatable rod section 88 is provided with a slot 96 in register with the slot 78 and through which the trigger member 80 extends. The rear end of the rotatable rod section 88 is formed with a slot 98 and a guide pin 100 carried by the barrel 72 projects through the slot 98 so as to connect the barrel and rod section for turning movement in unison, while still permitting relative sliding movement of the rod section within the barrel. The trigger member 80 is adapted to bear as at 102 against one end of the slot 96 in the rod section 88, and the forward movement of the trigger member 80, and consequently of the rod section 88, is limited by a stop surface 104 provided on the body 77.

The effective length of the non-rotatable rod section 90 is capable of being varied by means of an elongated pin 106 which extends through a bore 108 provided in the rod section 90 and which has its rear end projecting beyond the end of the rod section 90 and bearing against the end of the rod section 88. The forward end of the pin 106 is threadably received as at 109 in the forward end of the rod section 90 and an adjusting knob 110 secured to the extreme forward end of the pin 106 is secured to the pin so that the latter may be shifted in one direction or the other through the section 90 to increase or decrease its effective length and thus determine the "throw" of the friction bands 64. The trigger member 80 is normally held against the rear end of the slot 96 by means of a spring pressed plunger 112 disposed within a bore 113 provided in the rotatable rod section 88. The rear end of the barrel 72 threadably receives an adjusting plug 114 by means of which the compression of the spring 68 may be varied to in turn vary the pressure applied by the friction bands 64.

From the above description it will be seen that when no pressure is applied to the trigger member 80, the spring 68, acting through the two rod sections 88 and 90, will apply full spring pressure to the friction bands 64 tending to contract the same on the horizontal arm 16 of the split elbow 12, thereby not only holding the locking collar or brake 10 against turning movement about the horizontal axis of the arm, but also compressing the split end of the arm 16 and spreading the split leg 14 thereof in the manner previously described to lock the split elbow against turning movement about a vertical axis. The instrument support or pad 28 is thus locked against swinging movement about either a vertical or a horizontal axis. Upon depression of the trigger member 80, the rotatable rod section 88 will be moved to the left as viewed in Fig. 1, thereby compressing the spring 68 and allowing the rod section 90 to follow the movement of the rod section 88 to release the pressure on the friction bands 64 and permit the split sections 48 and 50 of the composite elbow arm 16 to move away from each other. Pressure of the split sections of the leg 14 against the inner wall surface of the base socket 20 is thus relieved so that the split elbow 12 is capable of turning movement within the base socket. At the same time, the relieving of pressure by the friction bands 64 on the arm 16 permits the locking collar 10 to be swung about the horizontal axis of the arm to tilt the instrument support or pad 28 in a fore and aft direction.

The instrument mounting of the present invention is capable of two main types of control. The instrument support or pad 28 may be locked in a fixed position against swinging movement about the horizontal axis of the arm 16 in a fore and aft direction, or it may be locked against panoramic swinging movement about the vertical axis of the leg 14. The instrument support may be released for both types of movement simultaneously upon depression of the trigger member 80. Alternatively, the control means may be so conditioned that release of the trigger member 80 is incapable of locking the instrument support 28 against panoramic swinging movement and is capable only of locking the support 26 against swinging movement about the horizontal axis of arm 16.

The control means for effecting these two types of locking action forms no part of the present invention and reference may be had to the above-mentioned patent and reference may be had to my co-pending Serial No. 251,016, filed October 12, 1951, for "Instrument Mounting and Method of Forming an Element Thereof."

This application discloses a manually controlled spreading means which extends between the two split sections of the arm 16 and which is operable under the control of an operating finger 116 (Fig. 2), when in one position, to spread the sections apart permanently so that the split clamping band 64 is incapable of contracting them and which is operable, when the finger 116 is in another position, to permit contraction of these sections under the control of the friction band 64.

Whereas in my prior patent, above referred to, the locking collar assembly 10 has been shown and described as being of one-piece cast construction, the present collar is formed of multiple piece construction as shown in Figs. 3, 4, 5 and 6. This locking collar 10 includes a pair of side plates 120 and 122 which may be in the form of light sheet metal stampings and which, in the assembled structure, are disposed in parallelism and serve to support therebetween adjacent their upper end a bushing 124, the extreme ends of which are reduced as at 126 and extend into aligned openings 128 provided at the upper ends of the side members 120 and 122. The reduced ends of the bushing 124 may be secured in position within the openings in any suitable manner as for example by soldering or brazing or the like. The bushing 124 and reduced upper ends of the sides 120 and 122 constitute the aforementioned apertured lug 32 which carries the adjustable instrument mounting 26.

The lower ends of the sides 120 and 122 are turned inwardly as at 130 and extend into a pair of diametrically opposed slots 132 provided in a lower bushing 134 and are suitably secured in the slots in any suitable manner as for example by brazing. The low bushing 134 and reduced lower ends of the sides 120 and 122 constitute the aforementioned lower lug 56 which supports the pistol grip assembly 60.

The medial regions of the sides 120 and 122 are enlarged and are provided with a pair of aligned apertures 136 and 138 therein which apertures serve to support therebetween a one-piece locking band assembly 140 including the split locking band section 64. The locking band assembly 140 is generally of cylindrical shape and comprises a cylindrical body which is split transversely along three planes at 142, 65, and 146 to provide the two locking band sections 64 and to provide two outer continuous ring sections 150 and 152. These latter ring sections 150 and 152 extend into the openings 136 and 138 respectively and may be soldered, brazed, or otherwise secured in position therein. The free ends of the two locking bands 64 have mounted thereon the respective attachment lugs 66 which may be of laminated sheet metal construction for the sake of strength and rigidity. It is to be noted that the extent of the locking bands sections 64 are relatively great and the movable portions of the band sections encompass approximately 270° about the surface area of the split sections of the horizontal arm 16 of the elbow structure 12 when the locking collar 10 is assembled in the instrument mounting. This enables the locking band to encompass a major portion of each section of the split arm 16 so as to move both sections, each one toward the other, rather than moving only one section relative to the other which is the case with the less extensive locking band shown in the above-mentioned patent. The continuous inner edges of the ring-like portions 150 and 152 of the locking band assembly 140, which are fitted within the openings 136 and 138 of the sides 120 and 122 respectively, constitute confining members for limiting the extent of spreading movement of the split sections of the horizontal arm 14 of the split elbow 12, so that the sections of the split elbow cannot be separated to such an extent as to dislodge the mating fulcrum areas or to force the sections out of proper alignment.

I claim:

1. In an instrument mounting structure of the character described, the combination with an arm member, of a locking collar for releasably gripping said arm member, the said collar comprising a pair of spaced, parallel, substantially flat, sheet metal side members provided with aligned medial openings therethrough and with offset aligned openings in the upper regions thereof, a bushing extending between said side members and having its opposite ends secured in said offset openings to provide an apertured lug, a second bushing having its axis extending at right angles to the axis of said first bushing and supported along its sides between the lower ends of said side members below said medial openings therein, and a locking band assembly including a cylindrical body formed at its opposite ends with continuous ring portions fixed in the medial openings of said side members and adapted to receive said arm member therein with capacity for turning movement of the locking collar about said arm and formed intermediate said continuous ring portions with an arcuate expandable and contractible band portion adapted to be flexed into releasable holding engagement with said arm member, whereby the said continuous ring portions of said cylindrical body and the said side members support the locking collar rotatably on said arm member independently of said arcuate band portion.

2. In a combination structure as defined in claim 1, characterized in that said expandable and contractible band portion is separated from said continuous ring portions by slots extending transversely of the cylindrical body and extending circumferentially around the greater portion of said cylindrical body.

3. In a combination structure as defined in claim 2, characterized in that said expandable and contractible band portion is divided by a central slot into a pair of bands, whereby the separate band portions are adapted to grip the said arm member of the instrument mounting structure.

4. In a combination structure as defined in claim 3, characterized in that the second bushing is formed on its external surface with diametrically exposed grooves extending lengthwise of the bushing and in that the lower ends of the side members are formed with inturned edges which fit into said grooves.

HARRY S. PASTURCZAK.

References Cited in the file of this patent

UNITED STATES PATENTS

| Number | Name | Date |
|--------|------|------|
| 822,326 | Tryon | June 5, 1906 |
| 902,205 | Brown | Oct. 27, 1908 |
| 2,424,499 | Pasturczak | July 22, 1947 |